US011915226B2

United States Patent
Mandaara et al.

(10) Patent No.: US 11,915,226 B2
(45) Date of Patent: *Feb. 27, 2024

(54) VALIDATION USING KEY PAIRS AND INTERPROCESS COMMUNICATIONS

(71) Applicant: 7-Eleven, Inc., Irving, TX (US)

(72) Inventors: Nishanth Mandaara, The Colony, TX (US); Gurmeet Singh, Irving, TX (US); Tarang Swadeshkumar Sethia, Frisco, TX (US); Maninder Singh Suri, Irving, TX (US)

(73) Assignee: 7-ELEVEN, INC., Irving, TX (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/226,433

(22) Filed: Apr. 9, 2021

(65) Prior Publication Data

US 2021/0233058 A1    Jul. 29, 2021

Related U.S. Application Data

(63) Continuation of application No. 16/176,269, filed on Oct. 31, 2018, now Pat. No. 11,062,297.

(Continued)

(51) Int. Cl.
*G06Q 20/32* (2012.01)
*G06Q 20/12* (2012.01)
(Continued)

(52) U.S. Cl.
CPC ......... *G06Q 20/3274* (2013.01); *G06Q 20/12* (2013.01); *G06Q 20/204* (2013.01);
(Continued)

(58) Field of Classification Search
CPC .. G06Q 20/3274; G06Q 20/12; G06Q 20/204; G06Q 20/3224; G06Q 2220/00
See application file for complete search history.

(56) References Cited

U.S. PATENT DOCUMENTS 8,387,864 B1 * 3/2013 Blackson ........... G06Q 20/0457
  235/379
8,893,964 B2 * 11/2014 Robison ............. G06Q 20/3829
  235/383

(Continued)

FOREIGN PATENT DOCUMENTS

CN   103220281 A   7/2013
CN   103942688 A   7/2014
(Continued)

OTHER PUBLICATIONS

Tsai, Jung-Fa, "A Secure Operational Model for Mobile Payments", Oct. 20, 2014, Hindawi Publishing Corporation.*

(Continued)

*Primary Examiner* — Steven S Kim
(74) *Attorney, Agent, or Firm* — BAKER BOTTS L.L.P.

(57) ABSTRACT

A validation terminal located at a registered location comprises a barcode reader, a memory, and a processor. The memory stores a public key that is paired with a private key linked with the registered location of the validation terminal. The processor is operably coupled to the barcode reader and the memory, and is configured to detect an encrypted barcode that was scanned by the barcode reader from a mobile device that is located at the registered location of the validation terminal. The encrypted barcode is based at least in part upon transaction information associated with products in a digital cart, and the encrypted barcode is encrypted using the private key. The processor is further configured to decrypt the encrypted barcode using the stored public key, and to indicate the transaction is valid in response to decrypting the encrypted barcode using the public key.

12 Claims, 5 Drawing Sheets

Related U.S. Application Data

(60) Provisional application No. 62/751,804, filed on Oct. 29, 2018.

(51) Int. Cl.
    *G06Q 20/20*     (2012.01)
    *G06Q 30/0601*     (2023.01)
    *H04L 9/30*     (2006.01)
    *H04L 9/32*     (2006.01)
    *G06K 19/06*     (2006.01)

(52) U.S. Cl.
    CPC ..... *G06Q 20/3224* (2013.01); *G06Q 30/0635* (2013.01); *H04L 9/30* (2013.01); *H04L 9/3226* (2013.01); *H04L 9/3297* (2013.01); *G06K 19/06037* (2013.01); *G06Q 2220/00* (2013.01); *H04L 2209/56* (2013.01); *H04L 2209/80* (2013.01)

(56) References Cited

U.S. PATENT DOCUMENTS

| | | | |
|---|---|---|---|
| 10,218,711 B2 * | 2/2019 | Smith | G06F 21/57 |
| 10,257,606 B2 * | 4/2019 | Vilhelmsen | G07C 9/00309 |
| 10,325,087 B1 * | 6/2019 | Goodsitt | H04L 9/3231 |
| 10,453,105 B2 * | 10/2019 | Butler | H04N 1/32144 |
| 11,062,297 B2 * | 7/2021 | Mandaara | G06Q 20/322 |
| 2006/0157574 A1 * | 7/2006 | Farrar | G06K 19/06046 |
| | | | 235/494 |
| 2007/0022058 A1 * | 1/2007 | Labrou | G06Q 20/322 |
| | | | 705/67 |
| 2011/0208659 A1 | 8/2011 | Easterly et al. | |
| 2012/0185398 A1 | 7/2012 | Weis et al. | |
| 2012/0308003 A1 * | 12/2012 | Mukherjee | H04L 9/3247 |
| | | | 380/243 |
| 2013/0151419 A1 * | 6/2013 | Hitchcock | H04W 12/10 |
| | | | 705/26.41 |
| 2013/0275194 A1 * | 10/2013 | Priyasantha | G06Q 30/0222 |
| | | | 705/14.23 |
| 2013/0311265 A1 * | 11/2013 | Prothero | G06Q 20/3821 |
| | | | 705/14.26 |
| 2014/0149294 A1 | 5/2014 | Leevendig et al. | |
| 2014/0263623 A1 | 9/2014 | Robison et al. | |
| 2014/0279191 A1 * | 9/2014 | Agarwal | G06Q 30/0633 |
| | | | 705/26.7 |
| 2015/0358163 A1 * | 12/2015 | Carter | G06F 21/645 |
| | | | 713/179 |
| 2015/0379506 A1 * | 12/2015 | Griffin | G06Q 20/3224 |
| | | | 705/44 |
| 2016/0189151 A1 * | 6/2016 | He | G06Q 20/401 |
| | | | 705/75 |
| 2016/0307194 A1 * | 10/2016 | Bhatnagar | H04L 63/0838 |
| 2016/0364790 A1 | 12/2016 | Lanpher et al. | |
| 2017/0070485 A1 * | 3/2017 | Kumar | H04L 9/0872 |
| 2017/0206516 A1 * | 7/2017 | Watson | G06Q 20/1085 |
| 2018/0181965 A1 * | 6/2018 | MacKinnon Keith | G06Q 20/326 |
| 2019/0007381 A1 * | 1/2019 | Isaacson | G06Q 20/12 |
| 2019/0019144 A1 * | 1/2019 | Gillen | H04L 9/3213 |
| 2019/0188672 A1 * | 6/2019 | Charles | G06Q 20/204 |
| 2020/0074438 A1 * | 3/2020 | Boemi | G06Q 20/201 |
| 2022/0253832 A1 * | 8/2022 | Hammad | G06Q 20/3276 |

FOREIGN PATENT DOCUMENTS

| | | | |
|---|---|---|---|
| CN | 107798531 A | | 3/2018 |
| JP | 2003124920 A | * | 4/2003 |
| JP | 2004171039 A | | 6/2004 |
| JP | 2018013996 A | | 1/2018 |
| WO | 2009070114 A1 | | 6/2009 |

OTHER PUBLICATIONS

P. Urien and S. Piramuthu, "Framework and authentication protocols for smartphone, NFC, and RFID in retail transactions," 2013 IEEE Eighth International Conference on Intelligent Sensors, Sensor Networks and Information Processing, Melbourne, VIC, Australia, 2013, pp. 77-82, doi: 10.1109/ISSNIP.2013.6529768.*

G. Sriram, B. Srikanthreddy, K. V. Seshadri, K. H. Kumar and N. Suresh, "Location Based Encryption-Decryption System for Android," 2018 International Conference on Smart Systems and Inventive Technology (ICSSIT), Tirunelveli, India, 2018 , pp. 590-593, doi: 10.1109/ICSSIT.2018.8748555.*

Google translation of JP2003124920A.*

Google translation of JP2018013996A.*

China National Intellectual Property Administration, First Office Action, Application No. 201980071874.7, Nov. 12, 2021, 6 pages.

Patent Cooperation Treaty, International Search Report and Written Opinion, International Application No. PCT/US2019/057545, dated Jan. 22, 2020, 13 pages.

Examination Report in India Application No. 202117018235 dated Dec. 26, 2022.

Japanese Patent Office, Office Action for JP Application No. 2021-547648, dated Oct. 24, 2023 (Oct. 24, 2023); 4 pages; [Official English Translation].

* cited by examiner

VALIDATION USING KEY PAIRS AND INTERPROCESS COMMUNICATIONS

CROSS-REFERENCE TO RELATED APPLICATIONS

This application is a continuation of U.S. patent application Ser. No. 16/176,269 filed Oct. 31, 2018, by Nishanth Mandaara et al., and entitled "VALIDATION USING KEY PAIRS AND INTERPROCESS COMMUNICATIONS," which claims benefit of U.S. Provisional Application No. 62/751,804 filed Oct. 29, 2018 by Nishanth Mandaara, et al., and entitled "VALIDATION USING KEY PAIRS AND INTERPROCESS COMMUNICATIONS," which are incorporated herein by reference as if reproduced in their entirety.

TECHNICAL FIELD

The present disclosure relates generally to interprocess communications, and more specifically to validating operations performed by mobile device using key pairs and interprocess communications.

BACKGROUND

Mobile devices (e.g. smart phones) allow users to access data content and services from anywhere in the world. This mobility allows users to perform operations such as streaming media or making purchases from home, work, or anywhere else without being tied to any particular location. This mobility poses several technical challenges because the operations performed on a mobile device are not inherently linked with where the mobile device is located. In other words, there is not a correlation between operations being performed on a mobile device and the location of the mobile device. Another example of a technical challenge posed by the mobility of mobile devices is that they are typically not configured to communicate with other devices or systems where the mobile device is located. In existing systems, mobile devices operate independently from other devices. Allowing mobile devices to freely communicate with other devices poses a security risk for both the mobile device and other devices. For example, a bad actor may try to access one of the devices to perform malicious activities such as data exfiltration. In addition, allowing mobile devices and other devices to freely communicate reduces network bandwidth and performance of both the mobile device and other devices due to all the data traffic that is being generated between devices. The reduction in network bandwidth creates a bottle neck that limits the performance of a device and its ability to communicate with other devices.

It is desirable to provide a solution that allows mobile devices to be used cooperative with other devices where the mobile device is located.

SUMMARY

Mobile devices (e.g. smart phones) allow users to access data content and services from anywhere in the world. This mobility allows users to perform operations such as streaming media or making purchases from home, work, or anywhere else without being tied to any particular location. This mobility poses several technical challenges because the operations performed on a mobile device are not linked with where the mobile device is located. In other words, there is not a correlation between operations being performed on a mobile device and the location of the mobile device. Another example of a technical challenge posed by the mobility of mobile devices is that they are typically not configured to communicate with other devices or systems where the mobile device is located. In existing systems, mobile devices operate independently from other devices. Allowing mobile devices to freely communicate with other devices poses a security risk for both the mobile device and other devices. For example, a bad actor may try to access one of the devices to perform malicious activities such as data exfiltration. In addition, allowing mobile devices and other devices to freely communicate reduces network bandwidth and processing performance of both the mobile device and other devices due to all the data traffic that is being generated and processed between devices. The reduction in network bandwidth creates a bottle neck that limits the performance of a device and its ability to communicate with other devices.

The system described in the present application provides a technical solution to the technical problems discussed above by enabling mobile devices to work cooperatively with other devices to link operations performed on a mobile device with the location of the mobile device. The disclosed system provides several advantages which include 1) enabling mobile devices to associate operations performed on the mobile device with the location of the mobile device, 2) enabling mobile devices to work cooperatively with other devices where the mobile device is located to facilitate various operations, and 3) providing the ability to validate operations performed on a mobile device at a particular location.

In one embodiment, the validation system enables a mobile device to associate and validate operations performed by the mobile device with the location of the mobile device. For example, the validation system is configured to determine whether the mobile device is currently located at a known registered location. This feature allows the validation system to enable services and communications between the mobile device and other devices at the registered location. This feature also improves the performance of the system by providing secure and controlled communications between the mobile device and other devices rather than allowing these devices to freely communicate.

Once an operation is performed on the mobile device, the validation system is configured to provide an encrypted barcode that can be used by other devices at the registered location to validate operations performed by the mobile device. The encrypted barcode is encrypted using a private key that is uniquely linked with a public key that is stored in a device at the registered location. When the encrypted barcode is presented to a validation device at the registered location, the validation device will validate the operation performed by the mobile device by decrypting the encrypted barcode using its public key. This feature allows operations performed by a mobile device to be validated by other devices using the public key stored at that location.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system described in the present application provides a technical solution to the technical problems discussed above by enabling mobile devices to work cooperatively with other devices to link operations performed on a mobile device with the location of the mobile device. The disclosed system provides several advantages which include 1) enabling mobile devices to associate operations performed on the mobile device with the location of the mobile device, 2) enabling mobile devices to work cooperatively with other devices where the mobile device is located to facilitate various operations, and 3) providing the ability to validate operations performed on a mobile device at a particular location.

Figure 1:
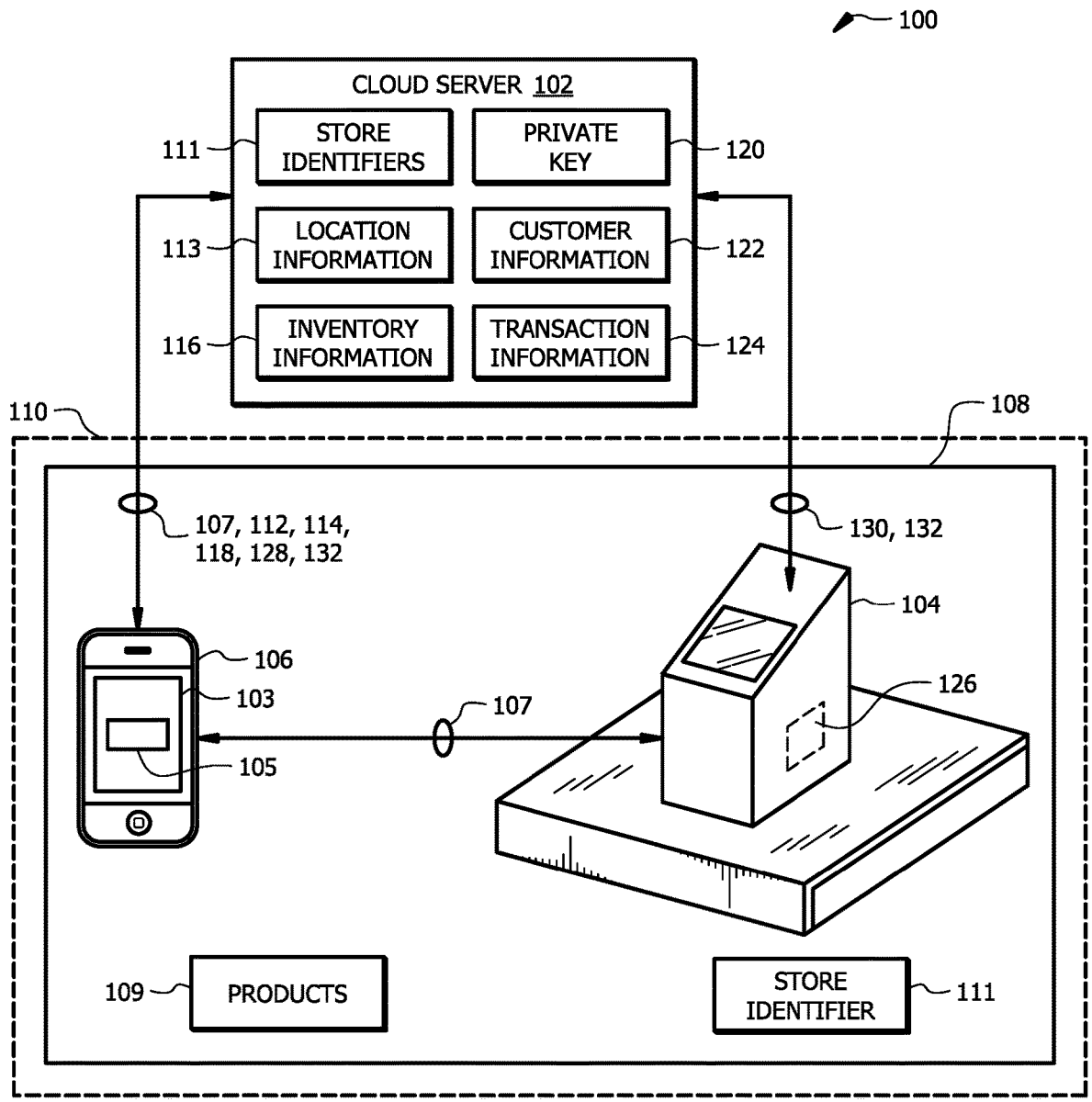
FIG. 1 is a schematic diagram of an embodiment of a validation system.
Figure 2:
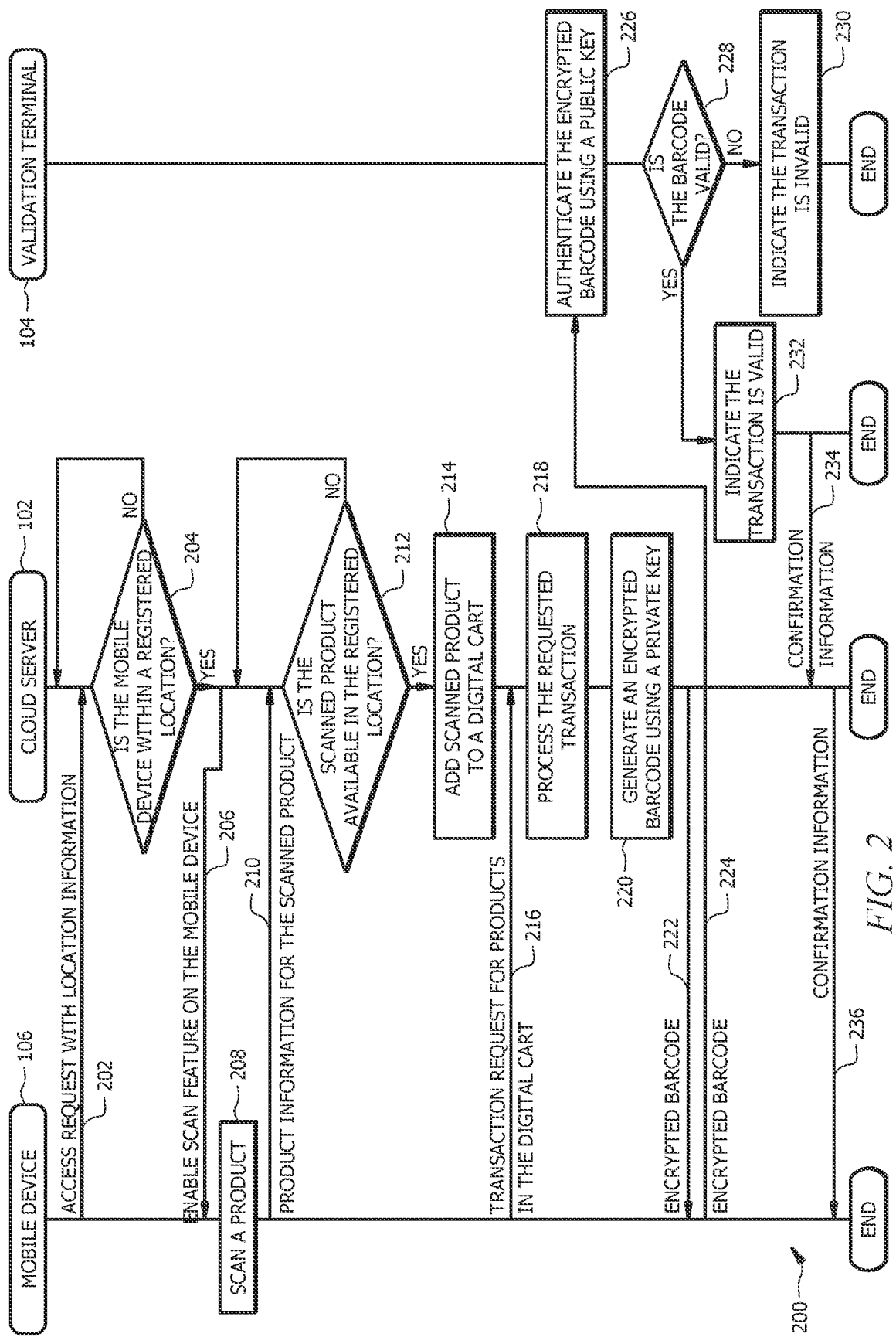
FIG. 2 is a protocol diagram of an embodiment of a validation method for a mobile device process.
Figure 3:
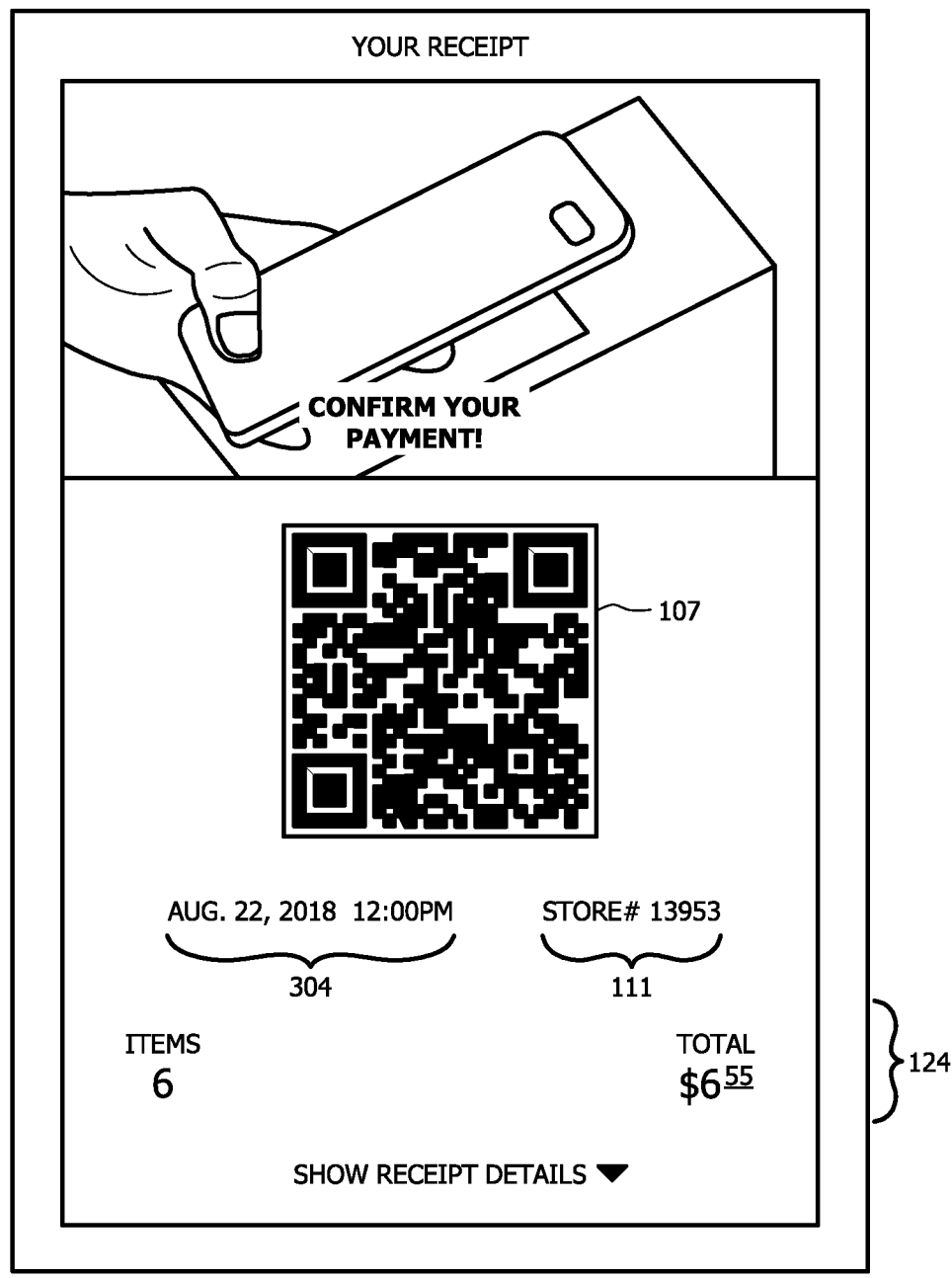
FIG. 3 is screenshot of an embodiment of an encrypted barcode used by the validation system.
Figure 4:
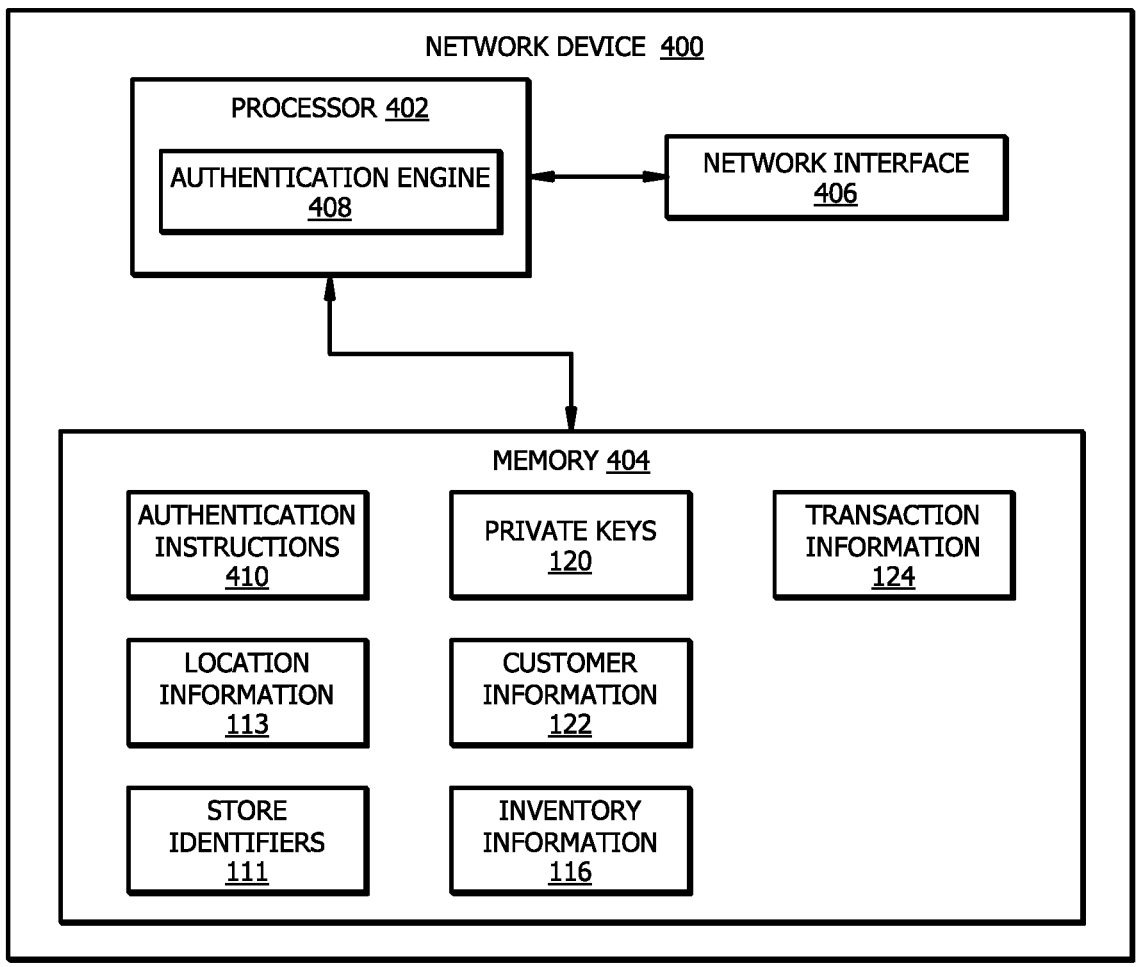
FIG. 4 is a schematic diagram of an embodiment of a network device configured to implement the validation method for a mobile device process.
Figure 5:
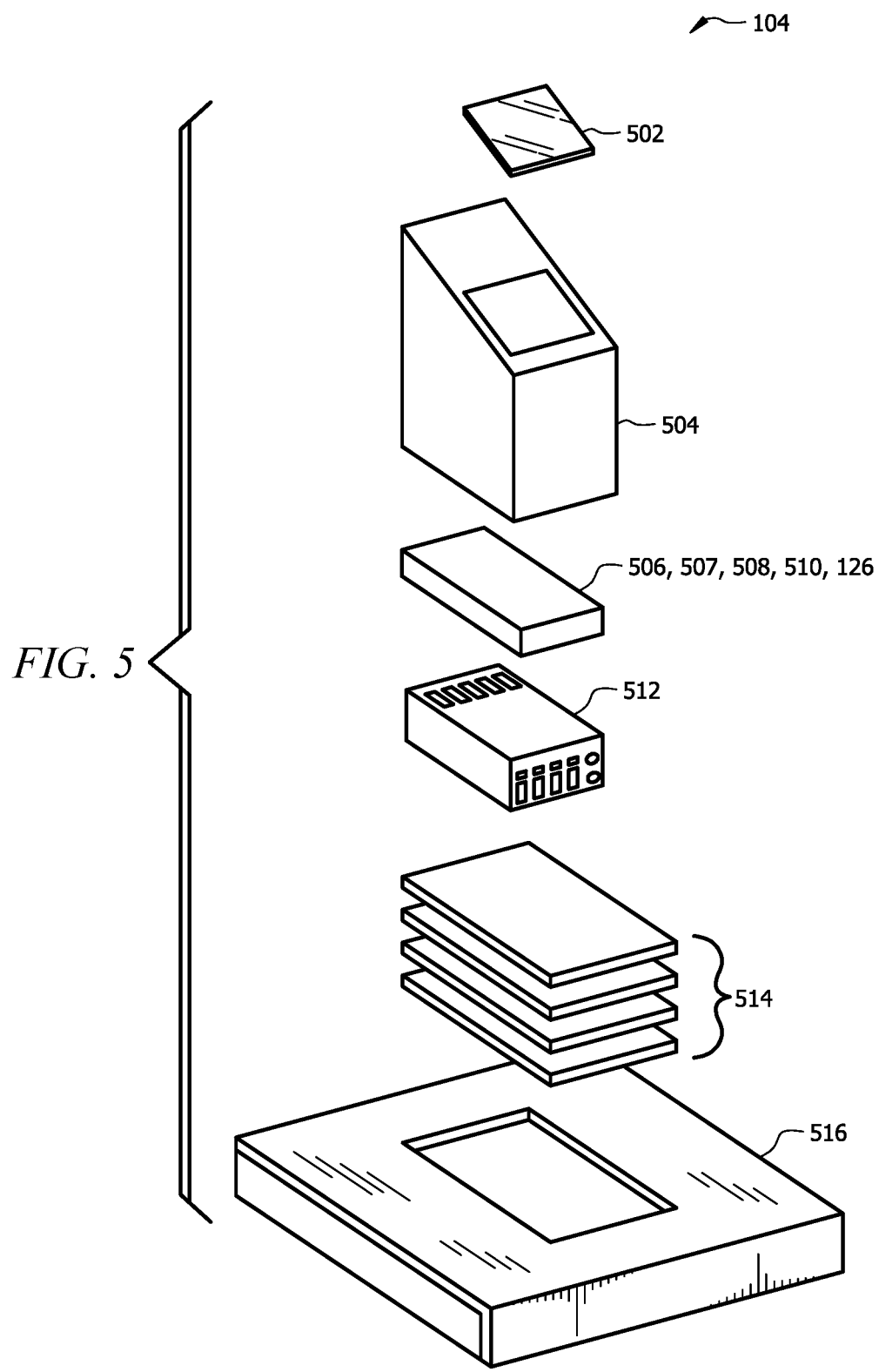
FIG. 5 is an exploded view of an embodiment of a validation terminal configured to implement the validation method for a mobile device process.

FIGS. 1 and 2 are examples of a validation system and process, respectively, for facilitating and validating a mobile device process. FIG. 3 is an example of a screenshot from a mobile application on a mobile device performing an operation. FIGS. 4 and 5 are examples of a network device and a validation terminal, respectively, configured to implement the validation process for a mobile device operation.

FIG. 1 is a schematic diagram of an embodiment of a validation system 100 for a mobile device process. Examples of mobile devices 106 include, but are not limited to, smart phones, tablets, or any other suitable type of network enabled device. Examples of mobile device processes include, but are not limited to, accessing data, streaming media, playing games, making a transaction, or any other type operation that can be performed on a mobile device 106. For instance, a mobile device self-checkout process is an operation that allows a customer to purchase products using their mobile device 106 within a registered location 108 (e.g. a store). During this process the customer scans products they would like purchase using the camera on their mobile device 106 to add the products 109 to a digital cart 105. Once the customer has finished scanning products 109, the customer uses their mobile device 106 to complete the transaction without using a traditional point-of-sale terminal (e.g. a cash register).

The validation system 100 disclosed herein is configured to use interprocess communication between a cloud server 102 and a validation terminal 104 to facilitate and validate such a mobile device operation. The validation system 100 comprises a cloud server 102 in signal communication with one or more validation terminals 104 and one or more mobile devices 106. The cloud server 102, the validation terminal 104, and the mobile device 106 may be in signal communication with each other using any suitable type of network or network connection. For example, the network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art upon viewing this disclosure.

The cloud server 102 may be any suitable type of server or other network device as would be appreciated by one of ordinary skill in the art. The cloud server 102 may be formed by one or more physical devices configured to provide services and resources (e.g. data and/or hardware resources) for mobile devices 106 and validation terminals 104. The cloud server 102 is generally configured to communicate with the mobile device 106 facilitate a mobile device operation. For example, the cloud server 102 may be configured to communicate with a mobile application 103 running on the mobile device 106 to add products 109 to a digital cart 105 and to process a transaction for the products in the digital cart 105. Once the transaction is completed, the cloud server 102 is configured to send an encrypted barcode 107 to the mobile device 106 that can be used to validate the transaction. An example of the cloud server 102 in operation is described in FIG. 2.

The validation terminal 104 is generally configured to process encrypted barcodes 107 provided by a mobile device 106 and to validate a transaction made by the mobile device 106 using the self-checkout process. The validation terminal 104 is configured to determine whether the customer has successfully completed their purchase before leaving registered location 108. For example, the verification terminal 104 may visually and/or audibly indicate that a customer transaction has been validated. An example of the validation terminal 104 in operation is described in FIG. 2.

The validation terminal 104 is located at or within a registered location 108. For example, the verification terminal 104 may be located on a counter near a cashier or may be in a standalone kiosk near the door of a store. The registered location 108 is a location or business that sells one or more products 109. Examples of a registered location 108 include, but are not limited to, stores, buildings, shopping centers, malls, or any other suitable type of location. In addition, each registered location 108 is also uniquely linked with a store identifier 111. A registered location 108 may be linked with any suitable type of identifier as would be appreciated by one of ordinary skill in the art. For example, a store identifier 111 may comprise an alphanumeric string. Registered locations 108 are identifiable using geofences 110. A geofence 110 is a virtual geographical boundary that is defined using Global Positioning System (GPS) or Radio Frequency Identification (RFID) technology. Using geofences 110, a validation terminal 104 and the registered location 108 where it resides can be uniquely linked with a physical address or GPS coordinates. In some embodiments, the cloud server 102 uses geofences 110 to determine whether a mobile device 106 has entered or exited a registered location 108 based on the location information of the mobile device 106. In this example, the cloud server 102 may be configured to use this process to enable or disable the mobile device's 106 ability to perform a mobile device self-checkout process.

Validation Process

FIG. 2 is a protocol diagram of an embodiment of a validation method 200 for a mobile device process. Method 200 uses interprocess communications between the cloud server 102 and the validation terminal 104 to facilitate and validate a mobile device operation. FIG. 2 illustrates a non-limiting example of the validation method 200 for facilitating and validating a transaction that is t made using a mobile device 106.

At step 202, the mobile device 106 sends an access request 112 comprising location information for the mobile device 106 to the cloud server 102. For example, a customer may use a mobile application 103 running on the mobile device 106 to communicate with the cloud server 102. In this example, the mobile device 106 sends the access request 112 to request permission to purchase products 109 using a mobile device self-checkout process. The location information may comprise GPS coordinates, a physical address, or any other suitable type of information that identifies the location of the mobile device 106. For example, the mobile device 106 may comprise a GPS sensor that is configured to provide GPS coordinates which may be used as the location information for the mobile device 106. In some embodiments, the access request 112 may comprise additional information such as customer information (e.g. a loyalty identifier) or credentials (e.g. a Personal Identification Number (PIN)). The access request 112 may be sent using any suitable type of messaging protocol as would be appreciated by one of ordinary skill in the art.

At step 204, the cloud server 102 determines whether the mobile device 106 is at a registered location 108 based on the received location information for mobile device 106. For example, the cloud server 102 determines whether the received location information (e.g. GPS coordinates) for the mobile device 106 matches any stored location information 113 linked with a registered location 108. In this example, the cloud server 102 determines that the mobile device 106 is at a registered location 108 when the location information for the mobile device 106 matches stored location information 113 linked with a registered location 108. In other words, the cloud server 102 determines that the mobile device 106 is within a store when their location information matches each other. The cloud server 102 proceeds to step 206 in response to determining that the mobile device 106 is at a registered location 108.

The cloud server 102 determines that the mobile device 106 is not at a registered location 108 when the location information for the mobile device 106 does not match any stored location information 113 linked with registered locations 108. In this case, the cloud server 102 determines that mobile device 106 is not at a store when the location of the mobile device 106 does not correspond with the location of any stores. This process allows the cloud server 102 distinguish between when the customer is physically at a store and when they are somewhere else, for example at home. The cloud server 102 continues to wait for an access request that comprises location information that indicates the mobile device 106 is at a registered location 180.

In one embodiment, the cloud server 102 is configured to send location information 113 that identifies one or more registered locations 108 near the mobile device 106. For example, the cloud server 102 may send addresses or GPS coordinates for other registered locations 108 that are near the mobile device 106. This feature can be used to inform the customer about other locations where they can perform a mobile device self-checkout. For example, the mobile application 103 may use the received location information 113 about nearby registered locations 108 to annotate a graphical map to identify locations where mobile device self-checkout services are available.

At step 206, the cloud server 102 sends instructions to the mobile device 106 for enabling a scan feature on the mobile device 106. The cloud server 102 may send instructions or commands to the mobile device 106 that activates or enables a scan or camera feature on the mobile application 103 that is running on the mobile device 106. For example, the mobile application 103 running on the mobile device 106 may be configured by default to disable a scan or camera feature on the mobile device 106 until the mobile device 106 receives instructions for activating this feature. Activating this scanning feature allows the mobile device 106 to scan products 109 to be added to a digital cart 105. In some embodiments, step 206 may be optional and omitted. For example, the mobile application and mobile device 106 may be preconfigured with the scan feature already enabled.

At step 208, the mobile device 106 scans a product 109 to determine product information for the product 109. The mobile device 106 may scan barcodes (e.g. stock keeping unit (SKU) barcodes, universal product code (UPC) barcodes, and Quick Response (QR) codes), labels, or any portion of a product 109. In one embodiment, the mobile device 106 uses a camera to scan or take a picture of a barcode on the product 109 to obtain product information for the product 109. In another embodiment, the mobile device 106 may capture an image of the product 109 using a camera and may perform object recognition to identify the object and product information for the product 109. In other embodiments, the mobile device 106 may use any other suitable technique as would be appreciated by one of ordinary skill in the art to identify a product 109 and its related product information.

At step 210, the mobile device 106 sends the product information 114 for the scanned product 109 to the cloud server 102. The product information 114 may comprise an image, a barcode, a product name, a product description, price information, or any other type of information for identifying a product 109. The mobile device 106 may send to product information 114 to the cloud server 102 using any suitable type of messaging format or protocol.

At step 212, the cloud server 102 determines whether the scanned product 109 is available at the registered location 108 where the mobile device 106 is located. The cloud server 102 identifies the scanned product 109 based on the received product information 114 and determines whether the product 109 is available at the registered location 108 based on inventory information 116 for the registered location 108. The inventory information 116 comprises information about products 109 that are currently available or in stock at the registered location 108. The cloud server 102 proceeds to step 214 in response to determining that the scanned product is available or in stock at the registered location 108. Otherwise, the cloud server 102 continues to wait for additional product information 114 from the mobile device 106 in response to determining that the scanned product 109 is not available or in stock at the registered location 108. In one embodiment, the cloud server 102 is configured to send location information 113 that identifies one or more registered locations 108 near the mobile device 106 where the scanned product is available.

At step 214, the cloud server 102 adds the scanned product 109 to a digital cart 105. The digital cart 105 is a virtual shopping cart that is associated with a particular user. The digital cart 105 displays information about products 109 in the virtual shopping cart. For example, the cloud server 102 may generate an entry in the digital cart 105 that identifies the scanned product, a quantity for the scanned product, a price for the scanned product, and/or any other suitable type of information for the scanned product. The digital cart 105 is accessible (i.e. viewable) from the mobile application 103 running on the mobile device 106. The digital cart 105 may be updated in about real time as the mobile device 106 scans products 109. In one embodiment, the cloud server 102 may also send information about the digital cart 105 to a cashier's mobile device to allow a cashier to monitor the activity of a mobile device 106 and the products 109 that are in a mobile device's 106 digital cart 105. For example, the cloud server 102 may send product information about the products 109 in the digital cart 105 as they are added to the digital cart 105.

In one embodiment, the cloud server 102 determines whether the scanned product 109 qualifies for any promotions or rewards. Examples of promotions and rewards include, but are not limited to, discounts, coupons, reward points, rebates, or any other type of special offer. The cloud server 102 may be configured to automatically apply any promotions or reward to the digital cart 105 in response to identifying the qualifying scanned product 109.

Steps 208-214 may be repeated for any number of products 109 that the mobile device 106 scans to place into the digital cart 105.

At step 216, the mobile device 106 sends a transaction request 118 for the products 109 in the digital cart 105. For example, the mobile device 106 may send payment information for facilitating a transaction for the products 109 in the digital cart 105. The mobile device 106 may send credit card information, account information, online payment service information, or any other suitable type of financial information for making an electronic transaction.

At step 218, the cloud server 102 processes the requested transaction based on the payment information provided in the transaction request 118. For example, the cloud server 102 may use the received payment information to facilitate an electronic purchase of the products 109 in the digital cart 105. In one embodiment, the cloud server 102 is configured to send transaction information to a cashier upon processing the transaction request 118. For example, the cloud server 102 may send transaction information to a cashier's mobile device to allow a cashier to monitor the transactions being made in the registered location 108 using the mobile self-checkout process.

At step 220, the cloud server 102 generates an encrypted barcode 107 using a private key 120. The cloud server 102 may generate a barcode based on customer information 122 (e.g. a loyalty identifier), a store identifier 111 for the registered location 108, transaction information 124 (e.g. product information or purchase amount), a timestamp (e.g. a date and time) for when the transaction was made, or any other suitable type of information. The generated barcode is configured to embed or encode the information that is used to generate the barcode. This information may be recovered later by other devices (e.g. a validation terminal 104). Examples of barcodes include, but are not limited to, one-dimensional barcodes (e.g. SKU barcodes and UPC barcodes) and two-dimensional barcodes (e.g. matrix barcodes and QR codes). The cloud server 102 may employ any suitable technique for generating a barcode. The cloud server 102 then identifies the private key 120 linked with the registered location 108 where the mobile device 106 is located and encrypts the generated barcode using the identified private key 120 to generate an encrypted barcode 107. The cloud server 102 may employ any suitable technique to encrypt the barcode using the private key 120. The barcode is encrypted such that the encrypted barcode 107 can only be decrypted using a corresponding public key 126 that is stored in a validation terminal 104 at the registered location 108.

At step 222, the cloud server 102 sends the encrypted barcode 107 to the mobile device 106. Once the mobile device 106 receives the encrypted barcode 107, the mobile device 106 may present the encrypted barcode 107 and any other information to the customer. In one embodiment, the cloud server 102 may also send dynamic content 128 with the encrypted barcode 107 to the mobile device 106. For example, the cloud server 102 may send content (e.g. an image) that is animated or moves when presented on the display of the mobile device 106. For instance, the dynamic content 128 may be animation, video, or special effect that plays on the mobile device 106. Examples of dynamic content 128 include, but are not limited to, GIF animations, Adobe Flash objects, JavaScript objects, HTML, objects, or any other suitable type of animated content. In this example, the dynamic content 128 may be used by the validation terminal 104 to distinguish between current information and a screenshot of previous information. This security feature prevents someone from making a valid transaction to obtain an encrypted barcode 107 and then trying to reuse the same encrypted barcode 107 again. Screenshots of previous information will only capture an instance in time and will not illustrate any active animations or movements being performed by the dynamic content 128. The validation terminal 104 may be configured to detect whether any dynamic content 128 is present and animated to determine whether an encrypted barcode 107 is current and valid.

Referring to FIG. 3 as an example, a screenshot 300 from a mobile application 103 operating on the mobile device 106 is shown. In FIG. 3, the mobile application 103 presents an encrypted barcode 107, a timestamp 304, a store identifier 111, and transaction information 124. In this example, the encrypted barcode 107 is a two-dimensional barcode (e.g. a QR code). The timestamp 304 may comprise the date and time when a transaction was processed or completed. The store identifier 111 identifies the registered location 108 where the transaction was made. The transaction information 124 comprises the total number of products 109 that were purchased and the total cost for the products 109. In other examples, the transaction information 308 may comprise any other suitable information. For example, the transaction information 124 may comprise an itemized list of products 109, product information 114, tax information, or any other suitable type of information.

Returning to FIG. 2, at step 224, the mobile device 106 presents the encrypted barcode 107 to the validation terminal 104. For example, the customer may place the display of the mobile device 106 adjacent to a barcode reader of the validation terminal 106 to present the encrypted barcode 107 to the validation terminal 104.

At step 226, the validation terminal 104 reads and authenticates the encrypted barcode 107 using a public key 126. The validation terminal 104 is preconfigured to store a public key 126 that is paired with the private key 120 stored in the cloud server 102. The public key 126 and the private key 120 are uniquely linked with the registered location 108 where the validation terminal 104 is located. The validation terminal 104 decrypts the encrypted barcode 107 using the locally stored public key 126 to retrieve the generated barcode. The validation terminal 104 may employ any suitable technique for decrypting the encrypted barcode 107 using the public key 126.

At step 228, the validation terminal 104 determines whether the barcode is valid. In one embodiment, the validation terminal 104 processes the barcode to retrieve a timestamp 304 (e.g. a date and time) for when the transaction was made. The validation terminal 104 determines whether the timestamp 304 is within a predetermined time window from the current time. For example, the validation terminal 104 may determine whether the timestamp 304 is for a time that is within the past fifteen minutes. In other examples, the predetermined time window may be any other suitable amount of time. In this example, the validation terminal 104 determines that the barcode is valid when the timestamp 304 is within the predetermined time window. The validation terminal 104 determines that the barcode is invalid when the timestamp 304 is outside of the predetermined time window. This security feature prevents customers from reusing barcodes from previous transactions.

In one embodiment, the validation terminal 104 determines whether the barcode or information presented with the barcode contains dynamic content 128. For example, the validation terminal 104 determines whether any dynamic content 128 on the display of the mobile device 106 is active (e.g. moving). In this example, the validation terminal 104 determines that the barcode is valid when the barcode is presented with dynamic content 128. The validation terminal 104 determines that the barcode is invalid when the barcode is not presented with dynamic content 128. This security feature prevents customers from reusing barcodes from previous transactions.

In other embodiments, the validation terminal 104 may use any other criteria or combination of criteria for determining whether the barcode is valid. The validation terminal 104 proceeds to step 232 in response to determining that the barcode is valid. Otherwise, the validation terminal 104 proceeds to step 230 in response to determining that the barcode is not valid.

At step 230, the validation terminal 104 indicates that the transaction is invalid and terminates method 200. For example, the validation terminal 104 may activate (i.e. turn on) one or more red light emitting diodes (LEDs) to indicate that the transaction is invalid. As another example, the validation terminal 104 may present a visual indicator on a liquid crystal display (LCD) that indicates the transaction is invalid. In other examples, the validation terminal 104 may employ any other suitable technique for visually indicating that the transaction is invalid. This process allows a cashier or worker to visually determine that a transaction is invalid and may require further attention. In one embodiment, the validation terminal 104 may send an alert 130 comprising information about the invalid transaction. The alert 130 may be an email, a text message (e.g. a short message service (SMS) message), an application pop-up alert, or any other suitable type of message notification.

Returning to step 228, the validation engine 104 proceeds to step 232 in response to determining that the barcode is valid. At step 232, the validation terminal 104 indicates that the transaction is valid. For example, the validation terminal 104 may activate (i.e. turn on) one or more green LEDs to indicate that the transaction is valid. As another example, the validation terminal 104 may present a visual indicator on a LCD that indicates the transaction is valid. In other examples, the validation terminal 104 may employ any other suitable technique for visually indicating that the transaction is valid. This process allows a cashier or worker to visually confirm that a transaction was valid and does not require any assistance.

At step 234, the validation terminal 104 sends confirmation information 132 to the cloud server 102. The confirmation information 132 may comprise information indicating that the transaction has been validated and is complete.

At step 236, the cloud server 102 sends confirmation information 132 to the mobile device 106. For example, the cloud server 102 may forward the confirmation information 132 to the mobile device 106 to be displayed on the mobile application 103 running on the mobile device 106.

Cloud Server Configuration

FIG. 4 is a schematic diagram of an embodiment of a network device 400 (e.g. cloud server 102) configured to implement the validation method 200 for a mobile device process. The network node 400 comprises a processor 402, a memory 404, and a network interface 406. The network device 400 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the authentication engine 408. In this way, processor 402 may be a special purpose computer designed to implement function disclosed herein. In an embodiment, the authentication engine 408 is implemented using logic units, FPGAs, ASICs, DSPs, or any other suitable hardware. The authentication engine 408 is configured to execute the operation performed by the cloud server 102 described in FIGS. 1 and 2.

The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM). The memory 404 is operable to store authentication instructions 410, location information 113, store identifiers 111, private keys 120, customer information 122, inventory information 116, transaction information 124, and/or any other data or instructions. The authentication instructions 410 may comprise any suitable set of instructions, logic, rules, or code operable to execute the authentication engine 408.

The memory 404 is configured to store location information 113 for a set of registered locations 108. Examples of location information include, but are not limited to, GPS coordinates, physical addresses, or any other suitable type of descriptor that uniquely identifies the location of the registered location 108.

Store identifiers 111 are used to uniquely identify a registered location 108 (e.g. a store). In one embodiment, a store identifier 111 may comprise an alphanumeric string. In other embodiments, a store identifier 111 may be any other suitable type of identifier as would be appreciated by one of ordinary skill in the art.

Private keys 120 are uniquely linked with registered locations 108. Each private key 120 is paired with a public key 126 that is stored locally in a validation terminal 104 located at a registered location 108.

Customer information 122 may comprise any suitable type of information linked with customers. Examples of customer information 122 include, but are not limited to, personal information, account information, loyalty identifiers, demographic information, financial information, transaction history information, or any other suitable type of information.

Inventory information 116 comprises information about products 109 that are currently available or in stock at the registered locations 108. For example, the inventory information 116 may identify products 109 and the quantity of products 109 that are in stock at a particular registered location 108. The inventory information 116 may be updated in about real time as transactions are made by customers. In some embodiments, the inventory information 116 may be obtained from one or more online databases.

The network interface 406 is configured to enable wired and/or wireless communications. The network interface 406 is configured to communicate data between the network device 400 and other network devices, systems, or domain. For example, the network interface 406 may comprise a WIFI interface, a LAN interface, a WAN interface, a modem, a switch, or a router. The processor 402 is configured to send and receive data using the network interface 406. The network interface 406 may be configured to use any suitable type of communication protocol as would be appreciated by one of ordinary skill in the art.

Validation Terminal Configuration

FIG. 5 is an exploded view of an embodiment of a validation terminal 104 configured to implement the validation method 200 for a mobile device process. In one embodiment, the validation terminal 104 comprises a scanning window 502, a housing 504, a processor 506, a memory 508 configured to store a public key 126, a network interface 510, a barcode reader 512, lights 514, and a base plate 516. The validation terminal 104 may be configured as shown or in any other suitable configuration. In some embodiments, the validation terminal 104 omit one or more components and/or may include one or more additional components. For example, the validation terminal 104 may further comprise a liquid crystal display (LCD) for providing visual information to a user.

The scanning window 502 is configured to allow the barcode reader 512 to scan barcodes that are positioned adjacent to the validation terminal 104. For example, a user may position a barcode in front of the scanning window 502 to be detected and read by the barcode reader 512. The scanning window 502 may be formed of any suitable type of glass or plastic material.

The housing 504 is configured to at least partially enclose the processor 506, the memory 508, the network interface 510, the barcode reader 512, and the lights 514. In one embodiment, the housing 504 is formed from a molded translucent plastic body. In this example, the lights 514 can be configured to emit light through the housing 504 which causes the housing to glow in the emitted light color. In other embodiments, the housing 504 may be formed of metals, wood, or any other suitable type of material.

The processor 506, the memory 508, and the network interface 510 may be configured similar to the processor 402, the memory 404, and the network interface 406 described in FIG. 4, respectively. The processor 506 is configured to execute instructions to implement a validation engine 507. In this way, processor 506 may be a special purpose computer designed to implement function disclosed herein. In an embodiment, the validation engine 507 is implemented using logic units, FPGAs, ASICs, DSPs, or any other suitable hardware. The validation engine 507 is configured to execute the operations performed by the validation terminal 104 described in FIGS. 1 and 2. The memory 508 is configured to store a public key 126 that is paired with a private key 120 that is stored in the cloud server 102. The public key 126 and the private key 120 are uniquely linked with the registered location 108 where the validation terminal 104 is located.

The barcode reader 512 is in signal communication with the processor 506 and is configured to read barcodes (e.g. encrypted barcodes 107). The barcode reader 512 may be any suitable type of barcode reader as would be appreciated by one of ordinary skill in the art.

The lights 514 may be any suitable type of lights as would be appreciated by one of ordinary skill in the art. In one embodiments, the lights 514 comprise LED lights.

The base plate 516 is generally configured to integrate the housing 504 with other structures. For example, the base plate 516 may be configured to integrate the housing 504 with a countertop. In other examples, the base plate 516 may be configured to integrate the housing 504 with a standalone kiosk or any other suitable type of structure. In one embodiment, the base plate 516 is formed from aluminum. In other embodiments, the base plate 516 may be formed of metals, wood, plastic, or any other suitable type of material.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a server communicatively coupled to a validation terminal, wherein the server is configured to:
receive location information of a mobile device;
determine that the received location information of the mobile device matches location information linked with a registered location;
identify a private key linked with the registered location where the mobile device is located;
generate a barcode based at least in part upon transaction information associated with products in a digital cart;
encrypt the barcode using the private key; and
provide the encrypted barcode to the mobile device; and
the validation terminal wherein the validation terminal is located at the registered location, wherein the validation terminal comprises:
a barcode reader;
a memory operable to store a public key, wherein the public key is paired with the private key wherein the private key is further linked with the registered location of the validation terminal; and
a processor operably coupled to the barcode reader and the memory, wherein the processor is configured to:
detect the encrypted barcode that was scanned by the barcode reader from the mobile device that is located at the registered location of the validation terminal;
decrypt the encrypted barcode using the public key; and
indicate the transaction is valid in response to decrypting the encrypted barcode using the public key.

2. The system of claim 1, wherein:
the encrypted barcode comprises a timestamp; and
indicating the transaction is valid in response to decrypting the encrypted barcode using the public key comprises:
obtaining the timestamp from the decrypted barcode; and
indicating the transaction is valid in response to determining that the timestamp is within a predetermined time window.

3. The system of claim 1, wherein the encrypted barcode is a two-dimensional barcode.

4. The system of claim 1, wherein indicating the transaction is valid comprises activating one or more light emitting diodes (LEDs).

5. The system of claim 1, wherein the encrypted barcode is further based at least in part upon a store identifier linked with the registered location.

6. The system of claim 1, wherein the processor is further configured to send confirmation information to the server in response to the decrypting the encrypted barcode using the public key.

7. A validation method comprising:
receiving, by a server, location information for a mobile device;
determining, by the server, that the received location information for the mobile device matches location information linked with a registered location of a validation terminal;
identifying, by the server, a private key linked with the registered location where the mobile device is located;
generating, by the server, a barcode based at least in part upon transaction information associated with products in a digital cart;
encrypting, by the server, the barcode using the private key;
providing, by the server, the encrypted barcode to the mobile device;
storing, by the validation terminal, a public key that is paired with the private key wherein the private key is further linked with the registered location of the validation terminal;
scanning, by the validation terminal, an encrypted barcode using a barcode reader of the validation terminal;
detecting, by the validation terminal, an encrypted barcode that was scanned by the barcode reader from a mobile device that is located at the registered location of the validation terminal;
decrypting the encrypted barcode using the public key; and
indicating the transaction is valid in response to decrypting the encrypted barcode using the public key.

8. The validation method of claim 7, wherein the encrypted barcode comprises a timestamp, and wherein indicating the transaction is valid in response to decrypting the encrypted barcode using the public key comprises:
obtaining the timestamp from the decrypted barcode; and
indicating the transaction is valid in response to determining that the timestamp is within a predetermined time window.

9. The validation method of claim 7, wherein the encrypted barcode is a two-dimensional barcode.

10. The validation method of claim 7, wherein indicating the transaction is valid comprises activating one or more light emitting diodes (LEDs).

11. The validation method of claim 7, wherein the encrypted barcode is further based at least in part upon a store identifier linked with the registered location.

12. The validation method of claim 7, further comprising sending confirmation information in response to the decrypting the encrypted barcode using the public key.

* * * * *